(12) United States Patent
Fu et al.

(10) Patent No.: US 10,873,172 B2
(45) Date of Patent: Dec. 22, 2020

(54) FIBER OPTICAL PARAMETRIC CHIRPED-PULSE AMPLIFICATION (FOPCPA)

(71) Applicant: Cornell University, Ithaca, NY (US)

(72) Inventors: Walter Fu, Ithaca, NY (US); Frank Wise, Ithaca, NY (US)

(73) Assignee: Cornell University, Ithaca, NY (US)

(\*) Notice: Subject to any disclaimer, the term of this patent is extended or adjusted under 35 U.S.C. 154(b) by 0 days.

(21) Appl. No.: 16/372,226

(22) Filed: Apr. 1, 2019

(65) Prior Publication Data
US 2019/0305506 A1 Oct. 3, 2019

Related U.S. Application Data

(60) Provisional application No. 62/650,984, filed on Mar. 30, 2018.

(51) Int. Cl.
*H01S 3/108* (2006.01)
*H01S 3/08* (2006.01)
*H01S 3/094* (2006.01)
*H01S 3/106* (2006.01)
*H01S 3/067* (2006.01)

(52) U.S. Cl.
CPC .......... *H01S 3/1083* (2013.01); *H01S 3/067* (2013.01); *H01S 3/06754* (2013.01); *H01S 3/08086* (2013.01); *H01S 3/094003* (2013.01); *H01S 3/094076* (2013.01); *H01S 3/1062* (2013.01)

(58) Field of Classification Search
CPC .............. H01S 3/08086; H01S 3/1083; H01S 3/094003; H01S 3/094076; H01S 3/1062; H01S 3/067; H01S 3/06754
See application file for complete search history.

(56) References Cited

U.S. PATENT DOCUMENTS

2014/0333994 A1\* 11/2014 Hugonnot ............... G02F 1/395
359/330

OTHER PUBLICATIONS

B. P.-P. Kuo and S. Radic, "Fast wideband source tuning by extra-cavity parametric process," Opt. Express 18, 19930 (2010).
C. Zhang, K. K. Y. Cheung, P. C. Chui, K. K. Tsia, and K. K. Y. Wong, "Fiber optical parametric amplifier with high-speed swept pump," IEEE Phot. Tech. Lett. 23, 1022 (2011).

(Continued)

*Primary Examiner* — Armando Rodriguez
(74) *Attorney, Agent, or Firm* — Perkins Coie LLP

(57) ABSTRACT

The technology described in this document can be used to implement an optical device including a seed pump laser to produce pump seed laser pulses at a pump wavelength, a pulse stretcher operable to stretch a pulse duration of the pump seed laser pulses to produce stretched pump seed laser pulses, a pump fiber amplifier including one or more fiber gain media to receive the seed pump laser pulses to produce a pump laser beam of pump laser pulses, a signal laser to produce a signal laser beam at a signal wavelength different from the pump wavelength, an optical module coupled to combine the pump laser beam and the signal laser beam, and a fiber optical parametric amplifier (OPA) to cause a nonlinear parametric interaction in the nonlinear fiber medium to produce an output signal beam, an output idler laser beam at an idler wavelength, and an output pump beam.

20 Claims, 14 Drawing Sheets

(56) References Cited

OTHER PUBLICATIONS

S. Lefrancois, D. Fu, G. R. Holtom, L. Kong, W. J. Wadsworth, P. Schneider, R. Herda, A. Zach, X. S. Xie, and F. W. Wise, "Fiber four-wave mixing source for coherent anti-Stokes Raman scattering microscopy," Opt. Lett. 37, 1652 (2012).

M. Hanna, F. Druon, and P. Georges, "Fiber optical parametric chirped-pulse amplification in the femtosecond regime," Opt. Express 14, 2783 (2006).

C. Caucheteur, D. Bigourd, E. Hugonnot, P. Szriftgiser, A. Kudlinski, M. Gonzalez-Herraez, and A. Mussot, "Experimental demonstration of optical parametric chirped pulse amplification in optical fiber," Opt. Lett. 35, 1786 (2010).

Y. Zhou, Q. Li, K. K. Y. Cheung, S. Yang, P. C. Chui, and K. K. Y. Wong, "All-fiber-based ultrashort pulse generation and chirped pulse amplification through parametric process," IEEE Phot. Tech. Lett. 22, 1330 (2010).

D. Bigourd, L. Lago, A. Mussot, A. Kudlinski, J.-F. Gleyze, and E. Hugonnot, "High-gain fiber, optical-parametric, chirped-pulse amplification of femtosecond pulses at 1 μm," Opt. Lett. 35, 3480 (2010).

P. Morin, J. Dubertrand, P. B. D'Augères, G. Bouwmans, A. Ku[dl]inski, Y. Quiquempois, A. Mussot, and E. Hugonnot, "μJ range optical parametric chirped pulse amplification of short pulses at 1 μm" in Conference on Lasers and Electro-Optics, OSA Technical Digest (2016) (Optical Society of America, 2016), paper STu11.5.

J. Demas, G. Prabhakar, T. He, and S. Ramachandran, "Wavelength-agile high-power sources via four-wave mixing in higher-order fiber modes," Opt. Express 25, 7455 (2017).

M. Brinkmann, T. Hellwig, and C. Fallnich, "Optical parametric chirped pulse oscillation," Opt. Express 25, 12884 (2017).

\* cited by examiner

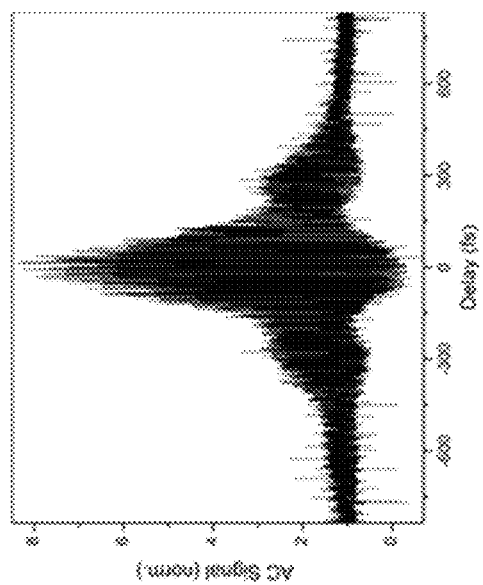
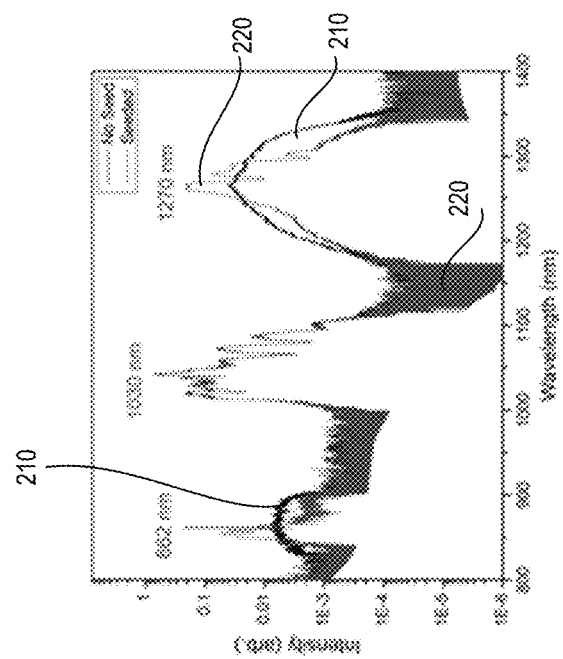
FIG. 2B
FIG. 2A

FIBER OPTICAL PARAMETRIC CHIRPED-PULSE AMPLIFICATION (FOPCPA)

PRIORITY CLAIMS AND RELATED PATENT APPLICATIONS

This patent document claims the priority and benefits of U.S. Provisional Application No. 62/650,984 entitled "OPTICAL PARAMETRIC CHIRPED-PULSE AMPLIFICATION (OPCPA)" and filed on Mar. 30, 2018. The entirety of the above application is incorporated by reference as part of the disclosure of this patent document.

STATEMENT OF GOVERNMENT SUPPORT

This invention was made with government support under grant no. EB002019 awarded by the National Institutes of Health (NIH), along with grant nos. ECCS-1306035 and ECCS-1609129, awarded by the National Science Foundation (NSF) as well as grant no. DGE-1650441, awarded by the National Science Foundation Graduate Research Fellowship Program (NSF GRFP). The government has certain rights in the invention.

TECHNICAL FIELD

This patent document discloses devices and techniques for generating pulsed lasers.

BACKGROUND

Energetic light pulses with short durations are used in numerous applications in science, industry, and medicine. For example, femtosecond lasers can allow probing of living structures without damaging the structures. In industrial applications, ultrashort laser pulses may be used for cutting, drilling, and ablating. These applications and new applications may be enabled by shorter pulses. New techniques and technologies are needed to generate ultrashort pulses that are extremely stable and robust, and which can be realized at an affordable cost.

SUMMARY

This patent document discloses devices and techniques that combines an optical parametric amplifier (OPA) and a chirped-pulse amplifier (CPA).

In one aspect, an optical device includes a seed laser to produce seed pump laser pulses at a pump wavelength, a pump fiber amplifier including one or more fiber gain media to receive the seed pump laser pulses to produce a pump laser beam of pump laser pulses that are amplified in energy in comparison with the seed pump laser pulses, a fiber stretcher operable to adjust a pulse duration of the pump laser pulses produced by the pump fiber amplifier, a continuous-wave (CW) signal laser to produce a CW signal laser beam at a signal wavelength different from the pump wavelength, an optical module coupled to combine the pump laser beam and the CW signal laser beam, and a fiber optical parametric amplifier (OPA) having a nonlinear fiber medium and coupled to receive the combined pump laser beam and the CW signal laser beam from the optical module to cause a nonlinear parametric interaction in the nonlinear fiber medium under an optical pumping in a normally-dispersive regime to produce an output signal beam, an output idler laser beam at an idler wavelength, and an output pump beam.

In another aspect, a pulsed laser device includes a seed laser to produce seed pump laser pulses at a pump wavelength, a pump fiber amplifier including one or more fiber gain media to receive the seed pump laser pulses to produce a pump laser beam of pump laser pulses that are amplified in energy in comparison with the seed pump laser pulses, a fiber stretcher operable to adjust a pulse duration of the pump laser pulses produced by the pump fiber amplifier, a continuous-wave (CW) idler laser to produce a CW idler laser beam at an idler wavelength different from the pump wavelength, an optical module coupled to combine the pump laser beam and the CW idler laser beam, and a fiber optical parametric amplifier (OPA) having a nonlinear fiber medium and coupled to receive the combined pump laser beam and the CW idler laser beam from the optical module to cause a nonlinear parametric interaction in the nonlinear fiber medium under an optical pumping in a normally-dispersive regime to produce an output signal beam at a signal wavelength, an output idler laser beam at the idler wavelength, and an output pump beam.

In another aspect, an optical device includes a seed pump laser to produce pump seed laser pulses at a pump wavelength, a pulse stretcher operable to stretch a pulse duration of the pump seed laser pulses to produce stretched pump seed laser pulses, a pump fiber amplifier including one or more fiber gain media to receive the seed pump laser pulses to produce a pump laser beam of pump laser pulses that are amplified in energy in comparison with the stretched pump seed laser pulses, a signal laser to produce a signal laser beam at a signal wavelength different from the pump wavelength, an optical module coupled to combine the pump laser beam and the signal laser beam, and a fiber optical parametric amplifier (OPA) having a nonlinear fiber medium and coupled to receive the combined pump laser beam and the signal laser beam from the optical module to cause a nonlinear parametric interaction in the nonlinear fiber medium under an optical pumping in a normally dispersive regime to produce an output signal beam, an output idler laser beam at an idler wavelength, and an output pump beam.

In another aspect, a fiber optical parametric chirped-pulse amplification device includes a seed pump laser to produce pump seed laser pulses at a pump wavelength, a pump fiber amplifier including one or more fiber gain media to receive the seed pump laser pulses to produce a pump laser beam of pump laser pulses that are amplified in energy in comparison with the seed pump laser pulses, a pulse stretcher operable to stretch a pulse duration of the pump laser pulses produced by the pump fiber amplifier, a signal laser to produce a signal laser beam at a signal wavelength different from the pump wavelength, an optical module coupled to combine the pump laser beam and the signal laser beam, and a fiber optical parametric amplifier (OPA) having a nonlinear fiber medium and coupled to receive the combined pump laser beam and the signal laser beam from the optical module to cause a nonlinear parametric interaction in the nonlinear fiber medium under an optical pumping in a normally dispersive regime to produce an output signal beam, an output idler laser beam at an idler wavelength, and an output pump beam.

In another aspect, a fiber optical parametric chirped-pulse amplification device includes a seed pump laser to produce a pump laser beam at a pump wavelength, a signal laser to produce a signal laser beam at a signal wavelength different from the pump wavelength, an optical module coupled to combine the pump laser beam and the signal laser beam, and a fiber optical parametric amplifier (OPA) having a nonlinear fiber medium and coupled to receive the combined pump laser beam and the signal laser beam from the optical module to cause a nonlinear parametric interaction in the nonlinear fiber medium under an optical pumping in a normally dispersive regime to produce an output signal beam, an output idler laser beam at an idler wavelength, and an output pump beam.

In another aspect, a fiber optical parametric chirped-pulse amplification device may include a pump beam generator to produce a chirped pump beam at a pump wavelength, a seed beam generator to produce a seed beam at a seed wavelength different from the pump wavelength, a pulse stretcher operable to temporally stretch pulse durations of the seed beam and the pump beam, a fiber optical parametric amplifier (OPA) including a fiber medium and coupled to the pulse stretcher to receive the stretched seed beam and the stretched pump beam from the pulse stretcher to cause a nonlinear parametric interaction in the fiber medium to produce an output seed beam at an output seed wavelength, an output idler beam at an idler wavelength, and an output pump beam at an output pump wavelength, and a pulse compressor operable to adjust a pulse duration of one or both of the output seed beam and the output idler beam to a certain duration shorter than the output seed wavelength and the idler wavelength. In some implementations, the pulse stretcher may include two separate pulse stretchers, one for the seed beam and the other for the pump beam.

In another aspect, a fiber optical parametric chirped-pulse amplification device implemented based on some embodiments of the disclosed technology may include a pump beam generator to produce a chirped pump beam at a pump wavelength, a pulse scale adjuster coupled to receive the chirped pump beam at the pump wavelength and an input seed beam at a seed wavelength different from the pump wavelength to temporally adjust pulse durations of the seed beam and the pump beam, a fiber optical parametric amplifier (OPA) including a fiber medium and coupled to the pulse scales adjuster to receive the adjusted seed beam and the adjusted pump beam to cause a nonlinear parametric interaction in the fiber medium to produce an output seed beam at an output seed wavelength, an output idler beam at an idler wavelength, and an output pump beam at an output pump wavelength, and a pulse compressor operable to adjust a pulse duration of one or both of the output seed beam and the output idler beam to a certain duration shorter than the output seed wavelength and the idler wavelength. The output seed beam is fed back from the OPA to the pulse scale adjuster to be used as the input seed beam.

BRIEF DESCRIPTION OF THE DRAWINGS

FIG. 2A shows spectrum without and with signal beam.
FIG. 2B shows interferometric autocorrelation of the isolated and dechirped idler pulse.

DETAILED DESCRIPTION

Figure 1:
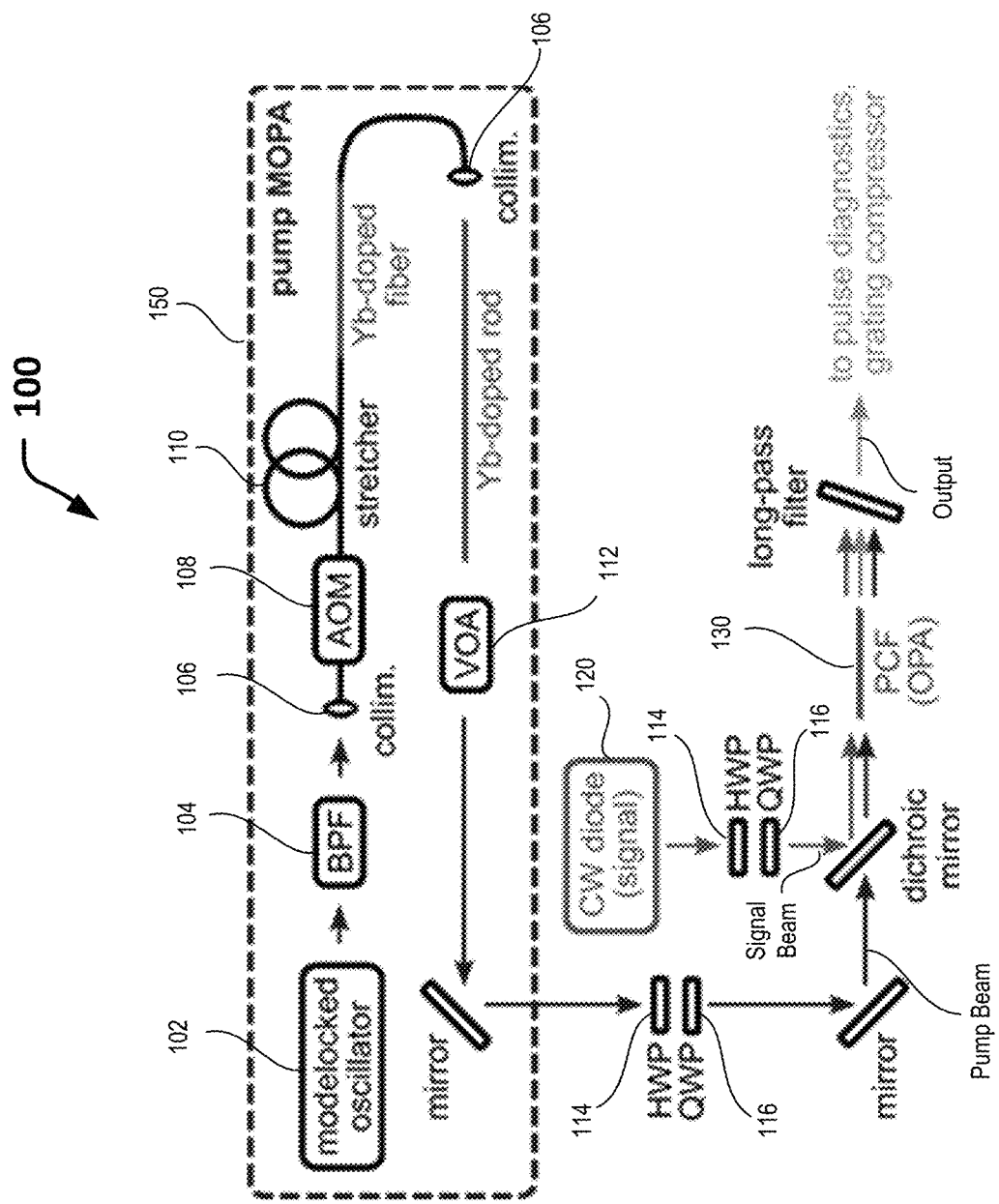
FIG. 1 shows an example of a specific embodiment of the disclosed fiber optical parametric chirped-pulse amplification system.

Energetic light pulses with short pulse durations such as 100 fs are useful for applications throughout science, industry, and medicine. Many of these applications are strongly wavelength-dependent and require pulse sources in particular spectral regions. In various pulse source implementations, laser gain media based on doping with rare-earth ions can be used to generate broadband, high-energy pulses, but only at select wavelengths.

An optical parametric amplifier (OPA) is a nonlinear optical system that converts photons from one wavelength to another based on a nonlinear parametric process in a nonlinear gain medium exhibiting the third-order $\chi^{(3)}$ nonlinearity. Such conversions can be used to achieve laser pulses at various desired optical wavelengths. For example, in various OPA implementations, three beams at different optical wavelengths may be involved: a pump beam, a signal beam at a signal wavelength longer than the pump wavelength and an idler beam at an idler wavelength longer than the pump wavelengths. The nonlinear parametric process converts the pump energy into the signal energy and the idler energy. The conversion may occur, for instance, in a waveguide such as optical fiber, with photons interacting via degenerate four-wave-mixing. Pairs of photons from a strong, pump beam are converted a signal photon and an idler photon at a shorter and longer wavelength, respectively. For this process to efficiently occur, the interaction must conserve both energy and momentum (aka phase-matching), which can be ensured by choosing an appropriate geometry or a waveguide with appropriate dispersion. OPAs are commonly used to generate light at wavelengths where no rare-earth-doped gain medium is readily available.

Separately, chirped-pulse amplification (CPA) is a well-established technique for amplifying optical pulses to high energies. The pulses are temporally stretched in a dispersive delay line, and the temporally stretched photons are then amplified and are subsequently recompressed using a dispersive delay line of the opposite sign. This process can suppress unwanted nonlinear effects and improve the energy extraction from a gain medium.

Optical parametric chirped-pulse amplification (OPCPA) combines the OPA and CPA into one device. As in CPA, pulses are stretched/compressed before/after amplification, but the amplifier now takes the form of an OPA. This approach combines the spectral flexibility of OPA with the performance scaling of CPA, and is an established technology for solid-state lasers. The OPCPA can also be performed in optical fiber (fiber OPCPA, or FOPCPA). While some FOPCPA systems have been demonstrated experimentally, they have generally resulted in low peak powers (e.g., Watt-level), long pulse durations (e.g., picosecond-scale), and/or small spectral shifts (e.g., operation within the gain window of a typical rare-earth-doped fiber). Some embodiments of the disclosed technology, however, use FOPCPA to generate femtosecond-scale pulses with high peak powers in otherwise-inaccessible spectral regions.

This patent document provides a technique for fiber optical parametric chirped-pulse amplification that generates high-energy, femtosecond-scale pulses at large frequency offsets from a pump source. One implementation of the disclosed technique is a system that is pumped with high-energy, broadband pump pulses and seeded with a much lower-power, continuous-wave beam. Through appropriate system design, pulses in widely-separated spectral regions can be generated that inherit the energy and bandwidth of the pump pulses. This technique can be readily scaled in the time domain, permitting the output pulse energy to be increased dramatically while retaining the practical benefits of a fiber-format system.

One implementation of such a fiber optical parametric chirped-pulse amplification system includes: (1) a master oscillator power amplifier (MOPA) to supply chirped pump pulses, hereafter referred to as the pump; (2) a continuous-wave (CW) laser diode to provide a signal beam, hereafter referred to as the signal or the seed; and (3) a fiber optical parametric amplifier (OPA), where the pump and signal are combined and the idler wave, hereafter referred to as the idler, is generated.

The pump wavelength may be selected to coincide with the gain spectrum of a gain medium, such as a rare-earth-doped gain medium, allowing it to take advantage of mature pulse generation technology at such wavelengths for generating high-energy, broadband, chirped pump pulses. In an appropriate fiber OPA (e.g., using a photonic crystal fiber), conversion via four-wave-mixing of the pump frequency $\omega_p$ to a signal frequency $\omega_s$ and an idler frequency $\omega_i$, satisfying the energy conservation law $2\omega_p=\omega_s+\omega_i$, will be naturally phase-matched over some finite range of signal and idler frequencies. If the pump alone is launched into the OPA, spontaneous four-wave-mixing will amplify the quantum noise present in these signal and idler spectral bands, resulting in the generation of incoherent spectral sidebands. These sidebands correspond to the so-called parametric gain spectrum.

If, however, the pump is launched into the OPA simultaneously with a signal beam that falls within the phase-matched signal band, a different outcome occurs. The coherent signal interacts with the pump, resulting in stimulated four-wave-mixing and the generation of coherent signal and idler sidebands. Importantly, if the phase-matched spectral regions are sufficiently broad, the generated idler inherits the bandwidth of the pump due to the energy conservation law holding at each individual point in time:

$$2\omega_p(t)=\omega_s+\omega_i(t) \quad \text{Eq. (1)}$$

The time dependence of $\omega_p$ comes from the pump being chirped, while $\omega_s$ is constant in time due to the CW nature of the signal (note that the latter is only valid if the coherence time of the signal is longer than the duration of the pump pulse). At each point in time, the pump will have a different wavelength, corresponding to a different parametric gain spectrum. In keeping with the energy conservation, this will correspond to a different idler wavelength being generated at each point in time, and as a result, the generated idler will inherit a chirp (and thus, a bandwidth) comparable to that of the pump. If the pump's chirp is approximately linear (as is common in a well-designed MOPA), the idler will be cleanly compressible in a dispersive delay line. Because four-wave-mixing only occurs when the pump pulses and CW signal temporally overlap, spectrally isolating the idler will produce a pulse train that mirrors the pump, without the low-intensity inter-pulse background that one may expect from using a CW signal.

The disclosed fiber optical parametric chirped-pulse amplification system can be scaled in the time domain, as per the CPA approach. Due to the high (kW-regime) peak power of the chirped pump, a relatively short photonic crystal fiber (e.g., on the order of 10 cm) can be used as the OPA medium, leading to dispersive effects being negligible. This means the OPCPA process is approximately timescale-invariant: doubling the pump pulse duration while holding the shape and peak power constant (i.e., doubling the pump energy) will simply result in an idler with twice the chirped duration, twice the energy, and an unchanged bandwidth. In this manner, the energy of the idler can be scaled without sacrificing the idler's bandwidth or compressed duration. Furthermore, scaling in the time domain provides a means of circumventing the fiber damage threshold (typically hundreds of kW) and the fundamental self-focusing limit (approximately 4 MW) by keeping the peak power in the fiber modest.

In implementations, the optical pumping is controlled in the normally-dispersive regime and the idler can be generated at a large wavelength offset from the pump wavelength, permitting generation of light in spectral regions useful for applications. This stands in contrast with numerous other OPA designs that utilize anomalously-dispersive pumping and subsequently achieved amplification within the gain windows of typical, rare-earth-doped fibers.

The disclosed fiber optical parametric chirped-pulse amplification system can be implemented by pumping with high-energy pulses (e.g., peak powers of tens of kilowatts) and using a very short (e.g., on the order of 10 cm) fiber as the OPA to achieve higher-energy pulses due to parametric nonlinear process (e.g., multiple nanojoules of energy).

FIG. 1 shows an example of a specific embodiment of the disclosed fiber optical parametric chirped-pulse amplification system. The fiber optical parametric chirped-pulse amplification system 100 may include a master oscillator power amplifier (MOPA) 150, a signal generator 120, and an optical parametric amplification (OPA) device 130. The fiber optical parametric chirped-pulse amplification system 100 may also include one or more half-wave plates (HWP) 114, one or more quarter-wave plates (QWP) 116, and other optical components such as fiber, rod, mirror, and filter.

The MOPA 150 may include an oscillator 102, a band-pass filter (BPF) 104, collimators 106, an acousto-optic modulator (AOM) 108, a stretcher 110, a variable optical attenuator (VOA) 112, one or more piece of fiber (e.g., Yb-doped fiber), and one or more rods (e.g., Yb-doped rod). The stretcher 110 may include fibers that can be used for stretching pulses. The signal generator 120 may include a continuous wave (CW) laser to generate a signal photon for the optical parametric amplifier (OPA). The OPA device 130 may include photonic crystal fiber (PCF).

The oscillator 102 may include a modelocked fiber oscillator operating near 1030 nm. The filter implemented in the fiber optical parametric chirped-pulse amplification system 100 may include a bandpass filter to improve the pulse shape and reduce temporal modulations. The AOM 108 may include an acousto-optic pulse picker. The one or more piece of fiber and the one or more rods may include one or more Yb-doped fiber amplifiers and one or more Yb-doped photonic crystal rod amplifiers, respectively. This results in pulses with ~100-500 nJ of energy, chirped durations of several picoseconds, and bandwidths supporting ~100-200 fs durations. The VOA may allow the pump energy launched into the OPA to be linearly adjusted.

As part of the OPA in FIG. 1, a laser diode with a linewidth of 100 kHz and a wavelength tunable over approximately 840-875 nm supplies a CW signal with mW-level power for the OPA. Waveplates are used to adjust the pump and signal polarizations independently in order to match their polarizations in the OPA while minimizing effects such as polarization modulation instability. In some embodiments of the disclosed technology, optical parametric amplification takes place inside the pump and signal beams are combined at a dichroic mirror, which transmits the 1030-nm pump while reflecting the approximately 850-nm signal. The spatially overlapped beams are then simultaneously aligned into the OPA, here about 10 cm of highly-nonlinear photonic crystal fiber. Experimentally and numerically, this fiber's parameters are found to phase-match conversion of the 1030 nm pump to a signal band near 850 nm and an idler band near 1300 nm. The pump, signal, and idler beams out of the OPA are guided to an output port. In FIG. 1, the output port is coupled to various pulse diagnostics, including an optical spectrum analyzer, a power detector, a grating compressor, and an interferometric autocorrelator. A long-pass filter is used to isolate the idler prior to certain kinds of measurements.

FIGS. 2A-2B show OPA output for a 2.2 ps pump pulse. FIG. 2A shows spectrum without (210) and with (220) the signal. FIG. 2B shows interferometric autocorrelation of the isolated and dechirped idler pulse.

Adjusting the length of the fiber stretcher permits pump pulses of various durations to be used. In a first experiment, the stretcher is removed, resulting in 2.2 ps pump pulses at the entrance to the OPA. When the pump alone is launched into the OPA, broad, featureless spectral sidebands appear near 850 nm and 1250 nm, indicating the parametric gain spectrum (FIG. 2A, 210). When an 862-nm signal is also present, markedly different behavior occurs (FIG. 2A, 220). Coherent spectral features appear near both the signal wavelength and the corresponding idler at 1270 nm. Isolating the latter with a long-pass filter results in a 1.6-nJ pulse which can be dechirped to below 200 fs (FIG. 2B). Note that in this and all subsequent spectra, chromatic aberrations make the relative intensities valid only within individual spectral bands (e.g., the signal band near 850 nm, the pump band near 1030 nm, and the idler band near 1300 nm), and not between different bands.

Figure 3:
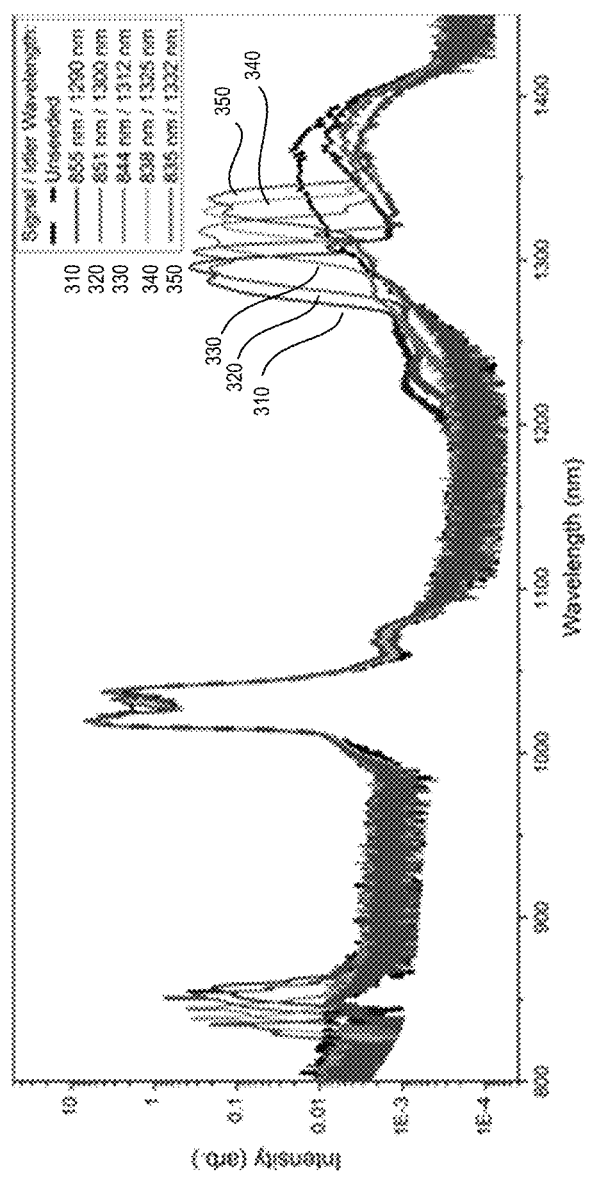
FIG. 3 shows OPA output spectra using 3.0-ps pump pulses for various signal wavelengths.
Figure 4:
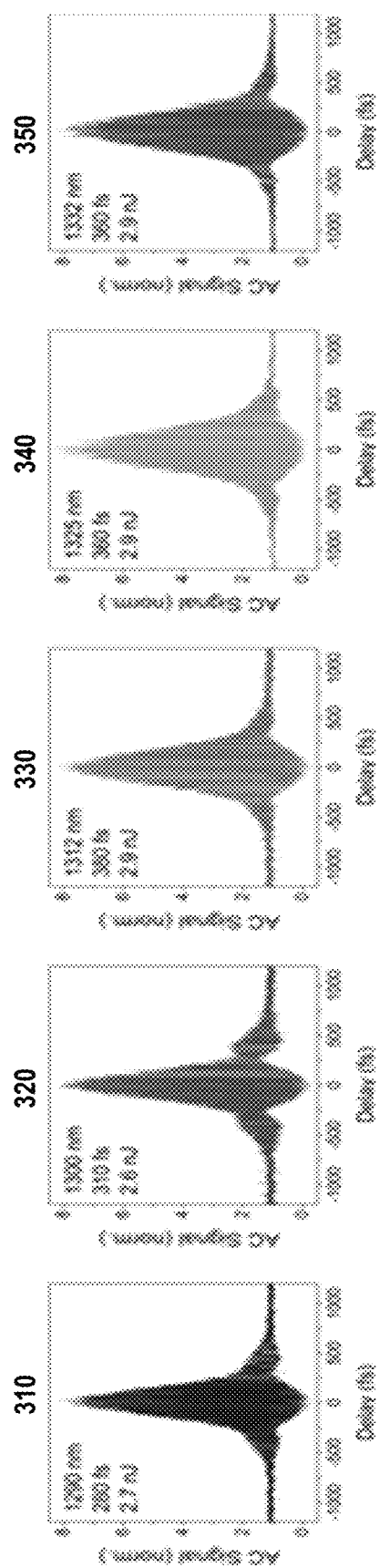
FIG. 4 shows interferometric autocorrelations of the dechirped idlers corresponding to the traces in FIG. 3.

FIG. 3 shows OPA output spectra using 3.0-ps pump pulses for various signal wavelengths. FIG. 4 shows interferometric autocorrelations of the dechirped idlers corresponding to the traces in FIG. 3. Labeled pulse durations are inferred from the full-width-half-max of the autocorrelation traces.

Figure 5A:
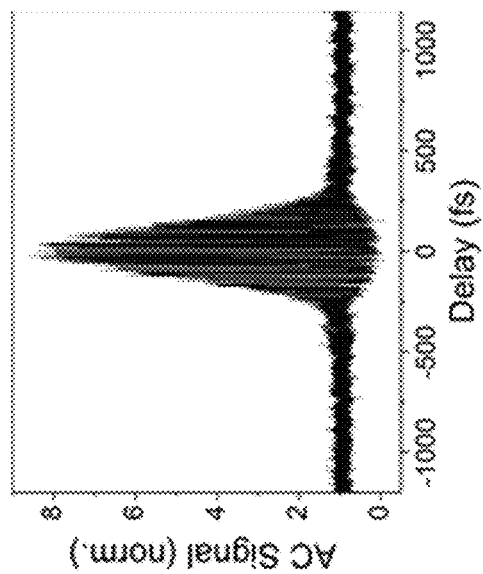
FIGS. 5A-5B show spectrum (FIG. 5A) and dechirped idler interferometric autocorrelation (FIG. 5B) of the OPA output using 3.8-ps pump pulses.
Figure 5B:
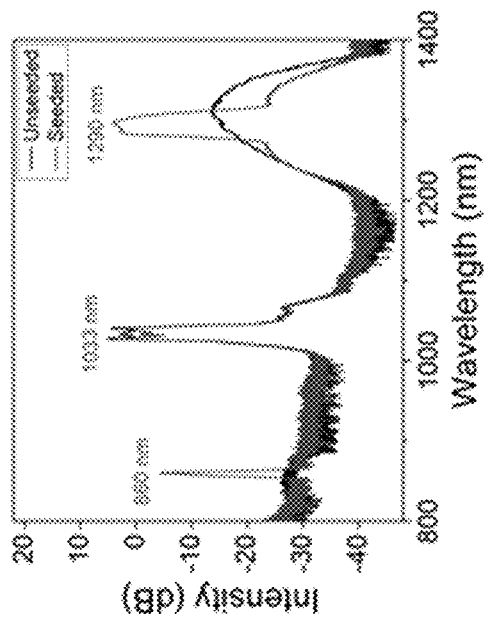

In a second experiment, a 10-meter stretcher fiber is inserted into the MOPA, producing 3.0-ps pump pulses at the OPA entrance. The slightly longer pump pulses are amplified to higher levels than previously in order to maintain approximately the same peak power. This temporal scaling results in correspondingly improved performance, with 2.9-nJ idler pulses now being obtainable. By tuning the signal wavelength, we are furthermore able to tune the idler wavelength over 1290-1330 nm, limited here by the tuning range of the signal diode (FIG. 3). In some cases, the idler can be tuned well outside the peak of the parametric gain spectrum. Corresponding autocorrelations for the dechirped idlers are shown in FIG. 4, which demonstrate that the pulse energy and duration are nearly constant over the spectral tuning range shown FIGS. 5A-5B show spectrum (FIG. 5A) and dechirped idler interferometric autocorrelation (FIG. 5B) of the OPA output using 3.8-ps pump pulses.

In a third experiment, the length of the stretcher fiber is increased to 20 meters, producing 3.8-ps pump pulses at the OPA entrance. This continued scaling in the time domain again results in improved performance, permitting the generation of 5.7-nJ idler pulses. The pulses can be dechirped to below 250 fs.

Figure 6:
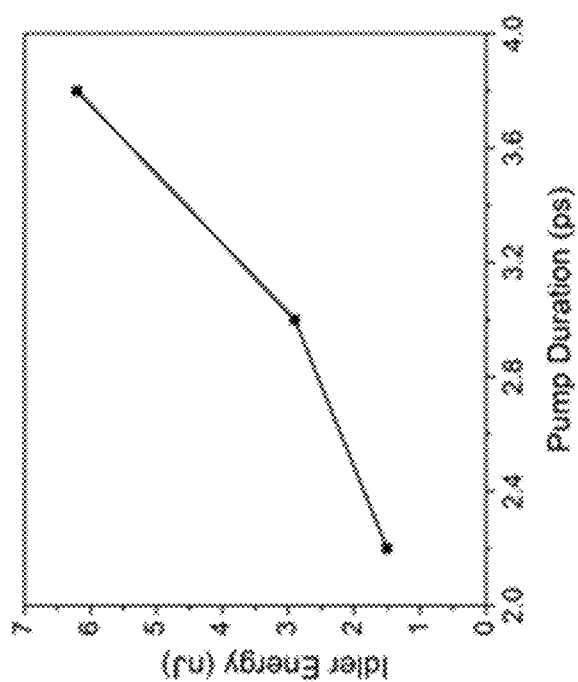
FIG. 6 shows idler energy at various pump pulse durations.

FIG. 6 shows idler energy at various pump pulse durations. Plotting the maximum achievable idler energy against the pump duration shows the expected increasing relationship, and confirms that the performance can be improved through time-domain scaling.

Various implementations of the disclosed fiber optical parametric chirped-pulse amplification system can be made. In an implementation, rather than injecting a continuous-wave signal beam to generate idler pulses, a continuous-wave idler may be launched in order to generate signal pulses.

In another implementation, spectral tuning may be accomplished via a continuously-tunable signal diode, as shown here, or by multiple signal diodes at different wavelengths. These diodes may be manually used, one at a time, or may be electro-optically modulated in turn (e.g., at MHz rates, synchronized with the pump pulse train) to produce a train of idler pulses of varying wavelengths.

In another implementation, before being launched into the OPA, pump pulses may be stretched to tens or hundreds of picoseconds in duration, or even longer, and amplified to maintain a constant peak power. The energy of the generated idler will scale up proportionately, resulting in output pulses with energies of many nanojoules or even microjoules that can still be compressed to femtosecond durations.

In another implementation, a polarization-maintaining OPA (exhibiting strong, consistent birefringence along one axis) may be used in place of the non-polarization-maintaining photonic crystal fiber used here. This would allow a linear polarization state to be maintained throughout, reducing depolarization and its effects on the parametric gain spectrum, and eliminating the need for quarter-wave plates prior to the OPA.

In another implementation, the idler may be spectrally isolated using another type of filter. For instance, a birefringent filter, a fiber Bragg device, a diffraction grating with a spatial aperture, or a photonic crystal structure may be employed.

In another implementation, linear compression of the idler might take other forms, such as a prism compressor, a chirped fiber Bragg grating, a chirped volume Bragg grating, or a photonic bandgap fiber In another implementation, an alternative medium may be used for the optical parametric amplifier itself, so long as it permits the necessary phase-matching. For instance, a step-index or graded-index optical fiber, or an integrated waveguide could be used.

In another implementation, pump pulses may be generated through an alternative means (e.g., a Q-switched laser; a gain-switched laser; a modulated, high-power, continuous-wave laser) if it possesses enough peak power and bandwidth.

The disclosed fiber optical parametric chirped-pulse amplification system may be used to allow short pulses with high peak powers to be obtained from a fiber source, even in spectral regions where no rare-earth-doped gain fiber is available. This constitutes a practical source for optical systems such as nonlinear microscopy, where imaging capabilities can depend strongly on the laser wavelength; hyperspectral imaging sources, where efficient wavelength conversion permits the use of multiple colors of light; and nonlinear spectroscopy sources, where intense light in different spectral regions enables the detection of different chemical species.

Figure 7:
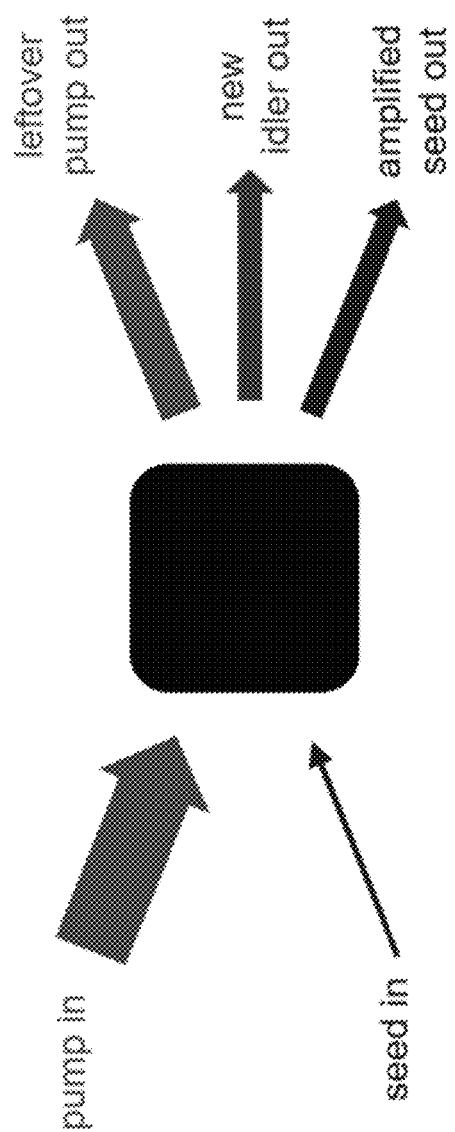
FIG. 7 shows an example of an optical parametric device.

FIG. 7 shows an example of an optical parametric amplifier (OPA) device illustrating different light signals. In an OPA, the inputs are the pump beam and a seed/signal beam at a different signal wavelength than the pump wavelength. The nonlinear interactions in OPA converts part of the energy in the pump beam to energy of other optical beams, e.g., amplifying the seed/signal beam, and also creating a new idler beam at an idler wavelength different than the pump and signal wavelengths. As shown in FIG. 7, based on two inputs, pump and seed beams, the OPA outputs a leftover pump beam, amplified seed/signal beam, and a new idler beam.

Figure 8:
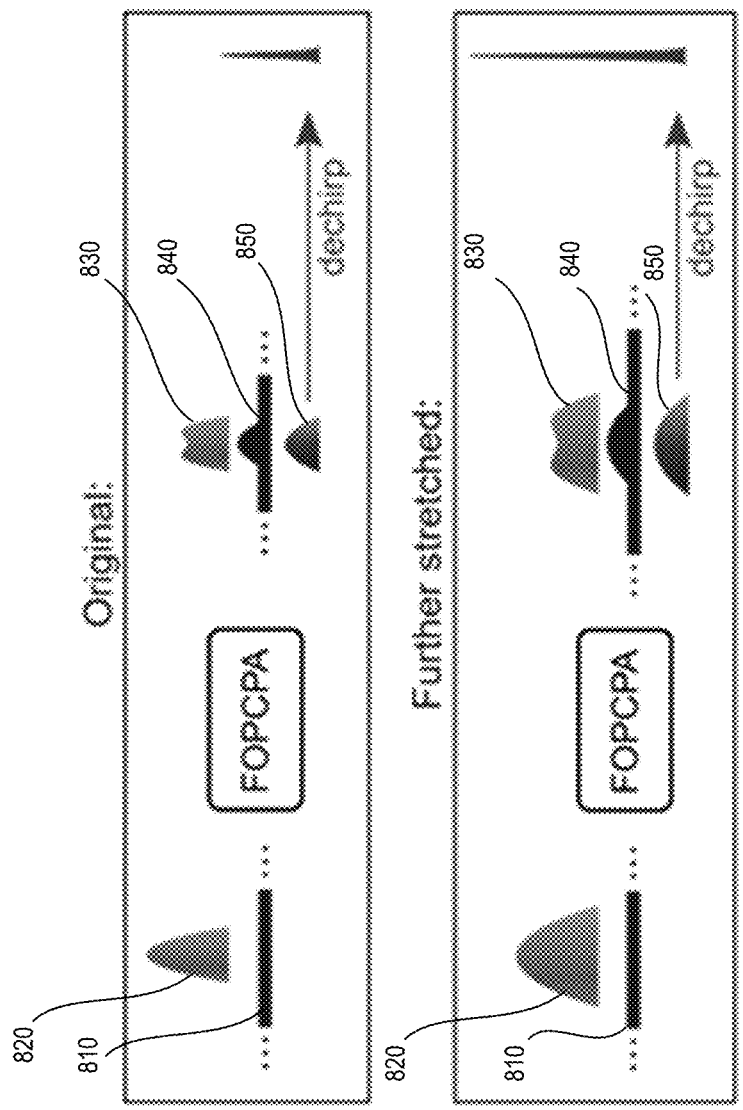
FIG. 8 shows scaling energy and peak power via temporal stretching based on an embodiment of the disclosed technology.

FIG. 8 shows scaling energy and peak power via temporal stretching based on an embodiment of the disclosed technology. A fiber optical parametric chirped-pulse amplification (FOPCPA) may generate a leftover broadband pump pulse 830, an amplified seed wave 840, and a generated broadband idler pulse 850, based on two inputs of broadband pump pulse 820 and seed wave 810 (initially continuous-wave). Various embodiments of the disclosed technology can be used to provide techniques for fiber optical chirped-pulse amplification that generate high-energy, femtosecond-scale pulses at large frequency offsets from a pump source. In some implementations, a high-energy, chirped pump pulse at one wavelength and a seed wave at some other wavelength are coupled into an optical fiber in such a way that the seed is amplified and a new, coherent, broadband, stretched pulse (referred to as the idler) is generated at a third distinct wavelength. The amplified seed and/or the generated idler can subsequently be spectrally isolated and linearly compressed using standard techniques. Thus, energetic, femtosecond-scale pulses at wavelengths differing markedly from the pump wavelength are obtained without sacrificing the practical benefits of a fiber-format system.

Figure 9A:
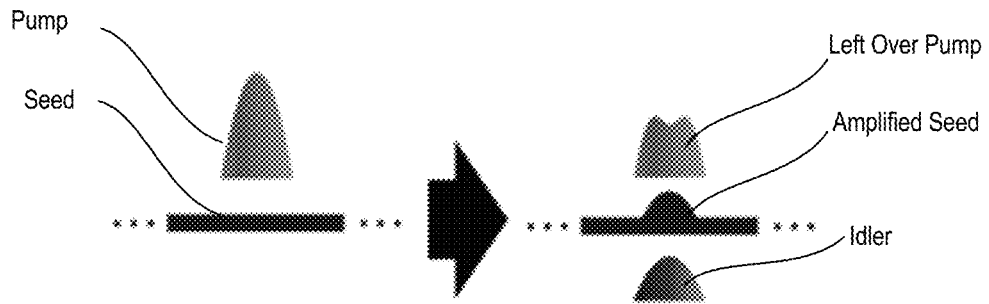
FIGS. 9A-9C show three different embodiments of the disclosed technology.
Figure 9B:
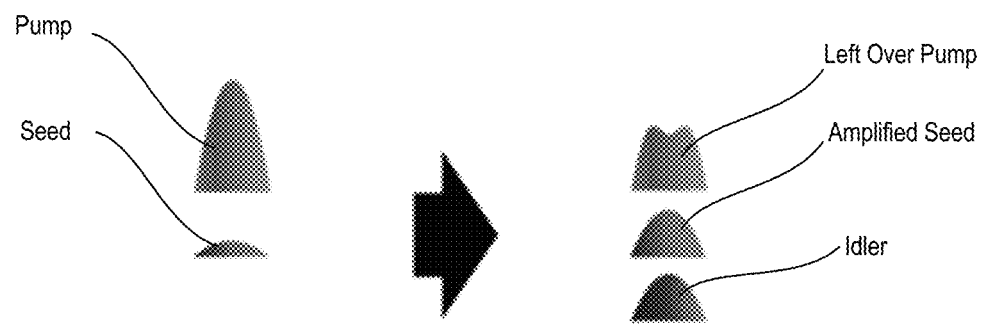
Figure 9C:
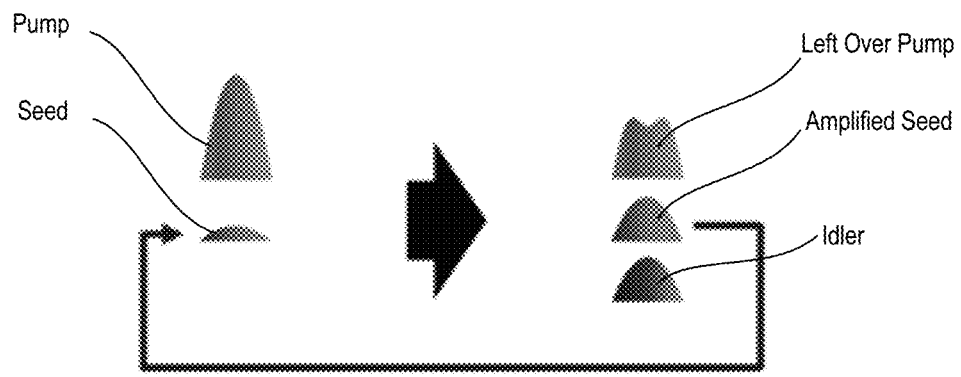
Figure 10A:
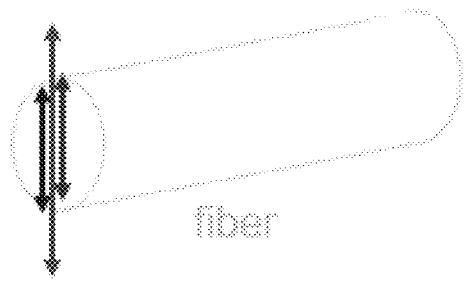
FIGS. 10A and 10B show two different phase matching types, including co-polarized phase matching type and cross-polarized phase matching type.

FIGS. 9A-9C show three different embodiments of the disclosed technology. FIGS. 10A and 10 B show two different phase matching types, including co-polarized phase matching type (10A) and cross-polarized phase matching type (10B).

One of the key features of these embodiments is the potential for scalability. To good approximation, these approaches are all timescale-invariant. That is to say, if the pump and seed pulses are further stretched to double their original durations (while holding their shapes, bandwidths, and peak powers constant), the duration of the generated output pulse will be doubled (while its shape, bandwidth, and peak power remains constant). This corresponds to a doubling in the output energy and (following linear dechirping) peak power of the output. The general principle of temporally stretching the entire system by a large factor in order to scale up the energy and peak power of the final, dechirped pulses is common to various embodiments of the disclosed technology.

A first distinction relates to the choice of an appropriate fiber. In FIG. 10A, a dispersion-engineered fiber (typically a microstructured or photonic crystal fiber; PCF) is chosen such that the phase-matching criterion for the target wavelengths is satisfied. The pump and seed are co-polarized with one another in order to maximize the strength of their interaction, and the generated waves are also polarized in the same plane.

Figure 10B:
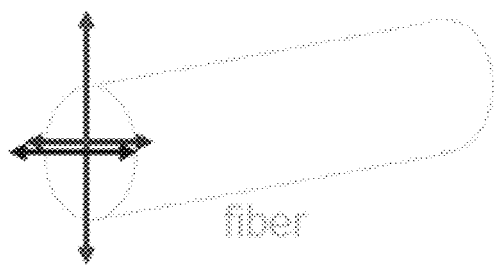

The system shown in FIG. 10B achieves phase-matching not with a dispersion-engineered fiber, but rather, through the use of polarization-maintaining fiber (PMF; a.k.a. birefringent fiber). Such fiber has two distinct polarization axes with different indices of refraction. In this case, the pump and seed are coupled into the fiber with orthogonal polarization states. This allows vectorally phase-matched nonlinear effects to occur, resulting in a newly generated wave that is cross-polarized with the pump and co-polarized with the seed. Some implementations of the disclosed technology may use PMF where the introduction of stress elements or asymmetry during the fabrication process yields the desired birefringent properties. As such, PMF need not be based on photonic crystals or microstructures, and more typically takes the form of simpler and more mature step-index fiber technology. By making use of these types of fibers as opposed to PCF, the system shown in FIG. 10B eliminates some practical issues. Because standard PMF lacks the versatility and design flexibility of PCF, systems based on the embodiment shown in FIG. 10B may require more pump power than those based on embodiments shown in FIG. 10A.

The systems shown in FIGS. 9A-9C differ in the means by which they are seeded. In FIG. 9A, the seed is a continuous-wave beam (e.g., from a diode laser separate from the pump system), with a bandwidth sufficiently narrow that the seed's wavelength can be taken to be constant over the duration of the chirped pump pulse. In this case, the section of the seed that temporally overlaps with the pump is amplified to create a narrowband pulse sitting on top of the remaining, unaffected, unamplified, continuous-wave background. The narrow bandwidth of this wave and the presence of the background mean it is rarely useful, and should be discarded. Concurrently with this process, however, energy conservation demands that the bandwidth of the pump be transferred to the idler, which manifests as a broadband, background-free pulse at a new wavelength. This is the wave that is typically sought in systems based on the system shown in FIG. 9A. Although this generates only one usable wavelength, the use of a continuous-wave seed greatly simplifies the system, as no precise synchronization between the pump and seed is required.

In FIG. 9B, the system is seeded with a broadband, chirped pulse synchronized with the pump. As both the pump frequency and the seed frequency vary in time, a different set of wavelength conversion processes will occur at each point in time, depending on how the pump and the seed are chirped relative to one another. By varying these relative chirps, the bandwidth of the output pulses can be widely tailored for a given application. This extra degree of freedom gives the system shown in FIG. 9B the potential for greater ultimate performance than the system shown in FIG. 9A. In addition, both the amplified seed and the generated idler are usable in this embodiment, allowing pulses at two new wavelengths to be generated within the same system. The system shown in FIG. 9B also does not require a second laser to supply the seed; on the other hand, this simplification comes at the cost of needing to use the same pump laser to generate a broadband seed at one of the new wavelengths, and then synchronizing the pump and seed to within a high degree of precision. While this is a known task with some commercially-established solutions (e.g., coherent supercontinuum generation), it nonetheless adds complexity and cost to the system that, in some instances, may outweigh the costs of simply using a separate seed source as per FIG. 9A.

FIG. 9C shows an oscillator configuration where the pump is supplied externally, the idler is fully output-coupled, and a fraction of the self-generated seed is recirculated. In this oscillator configuration, the system generates its own seed, which is stabilized and automatically shaped by the optical cavity. An advantage of this approach is that no deliberate seed generation on the user's part is required. However, the closed-loop nature of the system may increase the complexity of constructing it in a stable manner. For instance, the timing of the supplied pump pulses must precisely match up with the roundtrip time of the oscillator, so that each new pump pulse "catches" the constantly circulating pulse.

The embodiment shown in FIG. 10B differs from that shown in FIG. 10A in terms of the fiber used and the pump/seed polarizations. Thus, it can be seeded using any of the three methods discussed as per FIGS. 9A-9C. The choice of the seed is wholly independent of the choice of a fiber/polarization type. To one skilled in the art, any permutation would be a natural extension. Table 1 below illustrates the possibilities available.

TABLE 1

| | Phase-matching/fiber/polarization | |
|---|---|---|
| | Scalar/PCF/co-polarized | Vector/PMF/cross-polarized |
| Seed Continuous-wave seed Supercontinuum seed Self-generated seed (oscillator) | | |

Figure 11:
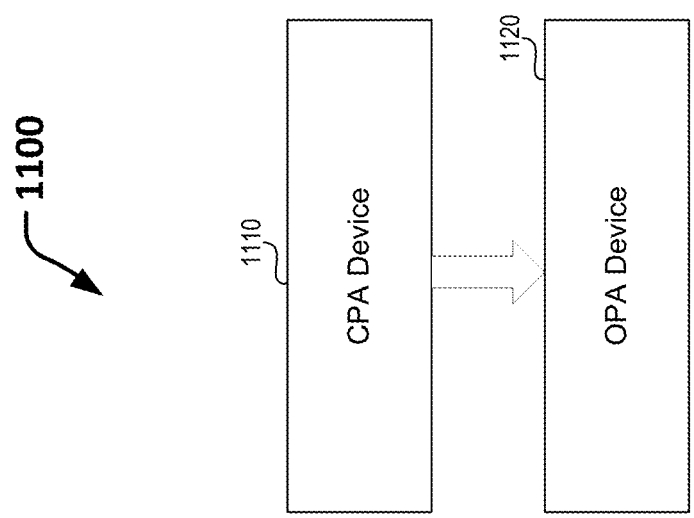
FIG. 11 shows an example of an optical parametric chirped-pulse amplification device implemented based on some embodiments of the disclosed technology.

FIG. 11 shows an example of an optical parametric chirped-pulse amplification device 1100 implemented based on some embodiments of the disclosed technology. The optical parametric chirped-pulse amplification device 1100 implemented based on some embodiments of the disclosed technology combines an OPA device 1120 and a CPA device 1110 into one device. Pulses are stretched/compressed at the CPA device 1110 before/after amplification at the OPA device 1120, thus combining the spectral flexibility of OPA with the performance scaling of CPA.

Figure 12:
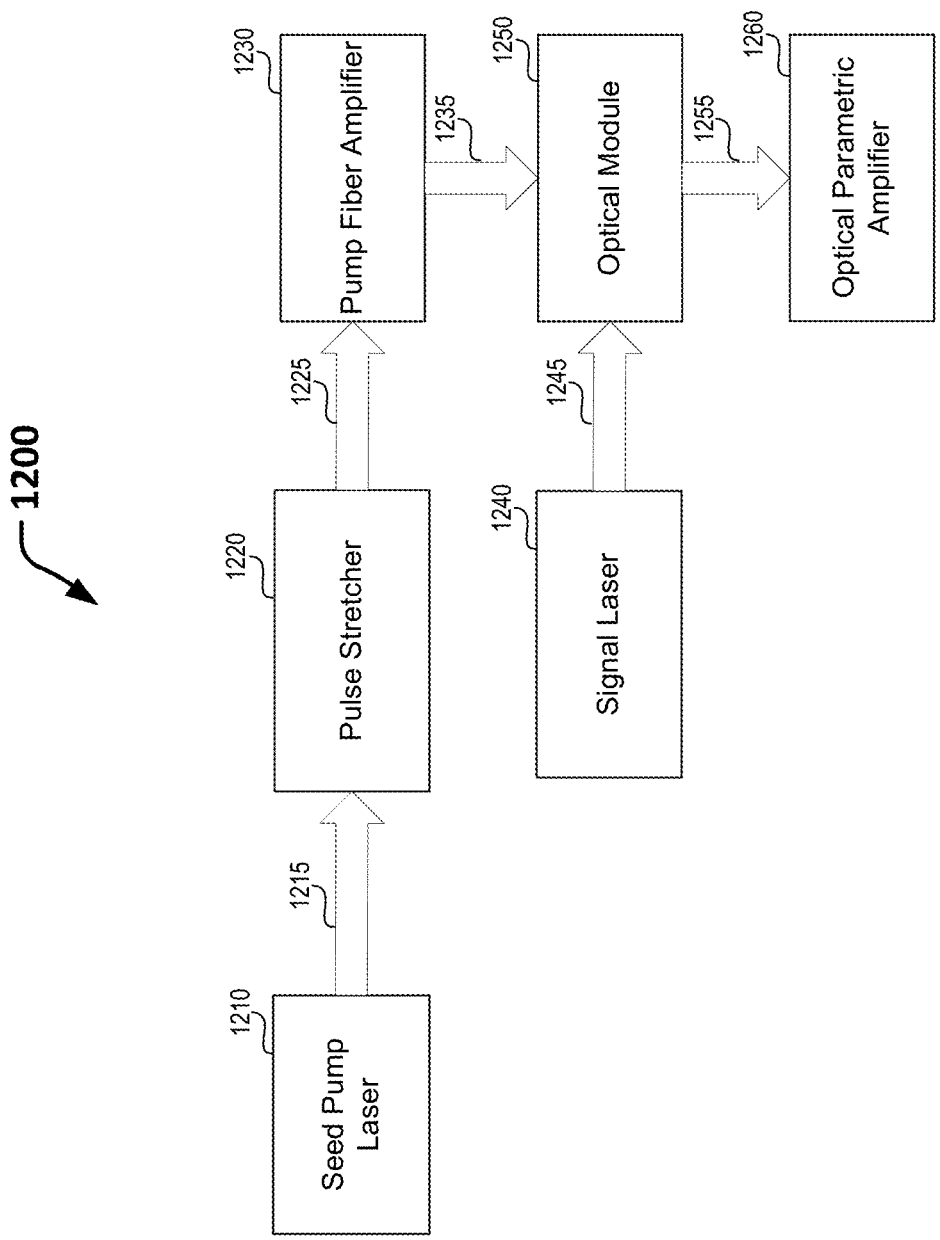
FIG. 12 shows another example of the optical parametric chirped-pulse amplification device implemented based on some embodiments of the disclosed technology.

FIG. 12 shows another example of the optical parametric chirped-pulse amplification device implemented based on some embodiments of the disclosed technology. The optical parametric chirped-pulse amplification device 1200 may include a seed pump laser 1210 to produce pump seed laser pulses 1215 at a pump wavelength, a pulse stretcher 1220 operable to stretch a pulse duration of the pump seed laser pulses to produce stretched pump seed laser pulses 1225, a pump fiber amplifier 1230 including one or more fiber gain media to receive the seed pump laser pulses 1215 to produce a pump laser beam of pump laser pulses 1235 that are amplified in energy in comparison with the stretched pump seed laser pulses seed pump laser pulses 1225, a signal laser 1240 to produce a signal laser beam 1245 at a signal wavelength different from the pump wavelength, an optical module 1250 coupled to combine the pump laser beam and the signal laser beam, and a fiber optical parametric amplifier (OPA) 1260 having a nonlinear fiber medium and coupled to receive the combined pump laser beam and the signal laser beam from the optical module to cause a nonlinear parametric interaction in the nonlinear fiber medium under an optical pumping in a normally dispersive regime to produce output beams 1255 including an output signal beam, an output idler laser beam at an idler wavelength, and an output pump beam. The optical parametric chirped-pulse amplification device may further include a pulse compressor (not shown) coupled to the OPA to linearly compress one or both of the output seed beam and the output idler beam.

Figure 13:
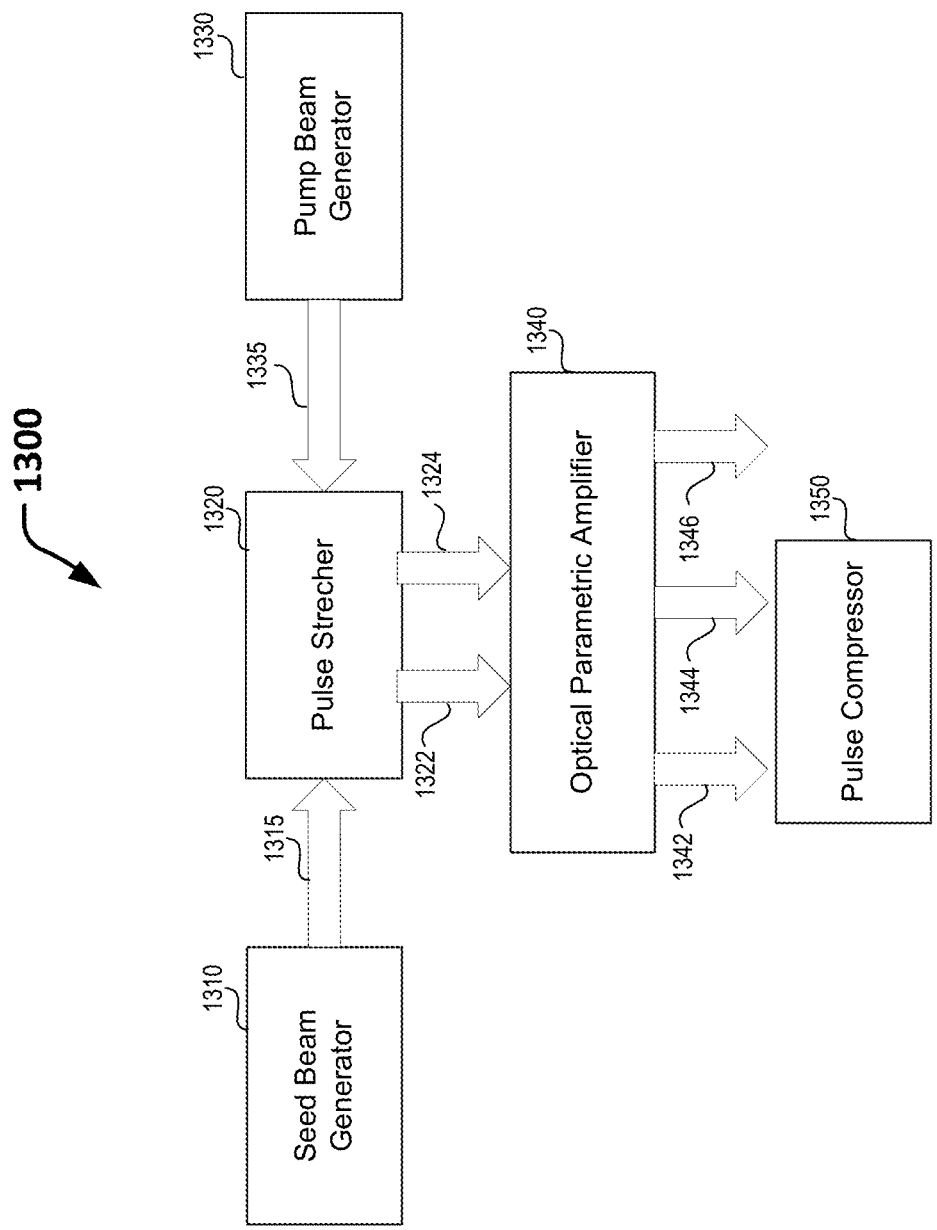
FIG. 13 shows another example of the optical parametric chirped-pulse amplification device implemented based on some embodiments of the disclosed technology.

FIG. 13 shows another example of the optical parametric chirped-pulse amplification device 1300 implemented based on some embodiments of the disclosed technology. The optical parametric chirped-pulse amplification device 1300 may include a pump beam generator 1330 to produce a chirped pump beam 1335 at a pump wavelength, a seed beam generator 1310 to produce a seed beam 1315 at a seed wavelength different from the pump wavelength, a pulse stretcher 1320 operable to temporally stretch pulse durations of the seed beam and the pump beam, a fiber optical parametric amplifier (OPA) 1340 including a fiber medium and coupled to the pulse stretcher to receive the stretched seed beam 1322 and the stretched pump beam 1324 from the pulse stretcher to cause a nonlinear parametric interaction in the fiber medium to produce an output seed beam 1342 at an output seed wavelength, an output idler beam 1344 at an idler wavelength, and an output pump beam 1346 at an output pump wavelength.

The optical parametric chirped-pulse amplification device 1300 may further include a pulse compressor coupled to the OPA to linearly compress one or both of the output seed beam and the output idler beam. In an implementation, the seed beam is a continuous wave beam. In another implementation, the seed beam is a broadband, chirped pulse synchronized with the pump beam. The OPA may include a dispersion-engineered fiber in which the pump laser beam and the signal laser beam are co-polarized with one another. For example, the OPA includes a photonic crystal fiber (PCF). As another example, the OPA may include a polarization-maintaining fiber in which the pump laser beam and signal laser beam may be co-polarized or counter-polarized with one another.

Figure 14:
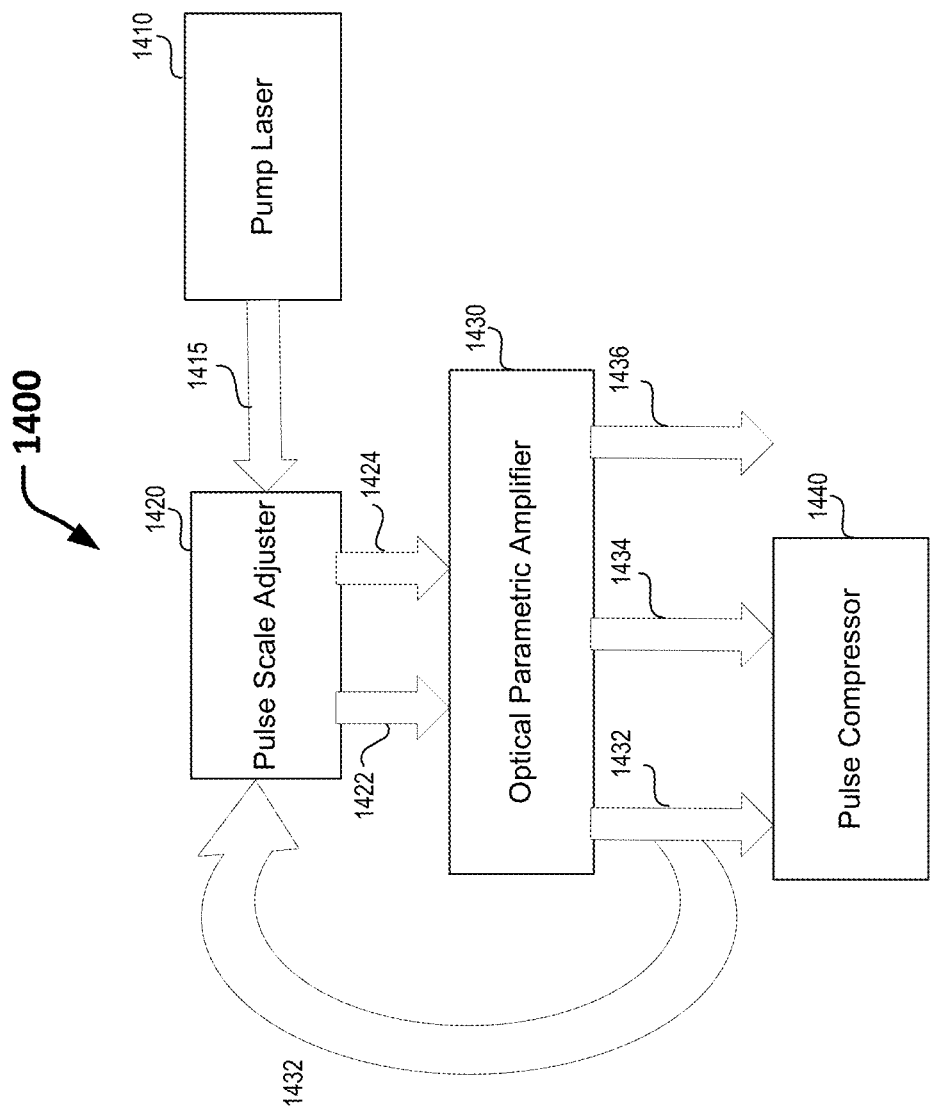
FIG. 14 shows another example of the optical parametric chirped-pulse amplification device implemented based on some embodiments of the disclosed technology.

FIG. 14 shows another example of the optical parametric chirped-pulse amplification device 1400 implemented based on some embodiments of the disclosed technology. The optical parametric chirped-pulse amplification device 1400 may include a pump laser 1410 to produce a chirped pump beam 1415 at a pump wavelength, a pulse scale adjuster 1420 coupled to receive the chirped pump beam 1415 at the pump wavelength and an input seed beam 1432 at a seed wavelength different from the pump wavelength to temporally adjust pulse durations of the seed beam and the pump beam, a fiber optical parametric amplifier (OPA) 1430 including a fiber medium and coupled to the pulse scales adjuster to receive the adjusted seed beam 1422 and the adjusted pump beam 1424 to cause a nonlinear parametric interaction in the fiber medium to produce an output seed beam 1432 at an output seed wavelength, an output idler beam 1434 at an idler wavelength, and an output pump beam 1436 at an output pump wavelength. Here, the output seed beam 1432 is fed back from the OPA to the pulse scale adjuster 1420 to be used as the input seed beam. The optical parametric chirped-pulse amplification device may further include a pulse compressor 1440 coupled to the OPA to linearly compress one or both of the output seed beam 1432 and the output idler beam 1434.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made based on what is described and illustrated in this patent document.

What is claimed is:

1. An optical device, comprising:
   a seed pump laser to produce seed pump laser pulses at a pump wavelength;
   a pulse stretcher operable to stretch a pulse duration of the seed pump laser pulses to produce stretched seed pump laser pulses;
   a pump fiber amplifier including one or more fiber gain media to receive the stretched seed pump laser pulses to produce a pump laser beam of pump laser pulses that are amplified in energy in comparison with the stretched seed pump laser pulses;
   a signal laser to produce a signal laser beam at a signal wavelength different from the pump wavelength;
   an optical module coupled to combine the pump laser beam and the signal laser beam to output a combined laser beam including the pump laser beam and the signal laser beam; and
   a fiber optical parametric amplifier (OPA) having a nonlinear fiber medium and coupled to receive the combined laser beam from the optical module to cause a nonlinear parametric interaction in the nonlinear fiber medium under an optical pumping in a normally dispersive regime to produce an output signal beam, an output idler laser beam at an idler wavelength, and an output pump beam.

2. The device as in claim 1, wherein the signal laser includes a continuous-wave (CW) signal laser to produce a CW signal laser beam.

3. The device as in claim 2, wherein the CW signal laser is a tunable CW laser configured to tune the signal wavelength to cause the idler wavelength of the output idler laser beam to be tuned.

4. The device as in claim 1, wherein the OPA includes a dispersion-engineered fiber in which the pump laser beam and the signal laser beam are co-polarized with one another.

5. The device as in claim 1, wherein the OPA includes a photonic crystal fiber (PCF).

6. The device as in claim 1, wherein the OPA includes a polarization-maintaining fiber.

7. The device as in claim 1, wherein the OPA includes a polarization-maintaining fiber in which the pump laser beam and signal laser beam are counter-polarized with one another.

8. The device as in claim 1, wherein the signal laser beam is a continuous wave beam or a broadband, chirped pulse synchronized with the pump laser beam.

9. A fiber optical parametric chirped-pulse amplification device, comprising:
   a pump laser beam generator to produce a chirped pump beam at a pump wavelength;
   a signal laser beam generator to produce a signal laser beam at a signal wavelength different from the pump wavelength;
   one or more pulse stretchers operable to temporally stretch pulse durations of at least one of the signal laser beam and the pump laser beam to produce output laser light;
   a fiber optical parametric amplifier (OPA) including a fiber medium and coupled to the one or more pulse stretchers to receive the output laser light from the one or more pulse stretchers to cause a nonlinear parametric interaction in the fiber medium due to presence of laser light at the pump wavelength and laser light at the signal wavelength to produce an output signal laser beam at the signal wavelength, an output idler laser beam at an idler wavelength, and an output pump laser beam at the pump wavelength; and
   a pulse compressor operable to shorten a pulse duration of one or both of the output signal laser beam and the output idler laser beam.

10. The device as in claim 9, wherein the signal laser beam is a continuous-wave laser beam.

11. The device as in claim 9, wherein the signal laser beam is a broadband, chirped pulse synchronized with the pump laser beam.

12. The device as in claim 9, wherein the OPA includes a dispersion-engineered fiber in which the pump laser beam and the signal laser beam are co-polarized with one another.

13. The device as in claim 9, wherein the OPA includes a photonic crystal fiber (PCF).

14. The device as in claim 9, wherein the OPA includes a polarization-maintaining fiber.

15. The device as in claim 9, wherein the OPA includes a polarization-maintaining fiber in which the pump laser beam and signal laser beam are counter-polarized with one another.

16. A fiber optical parametric chirped-pulse amplification device, comprising:
   a pump laser beam generator to produce a chirped pump laser beam having chirped pump laser pulses at a pump wavelength;
   a pulse scale adjuster coupled to receive the chirped pump laser beam at the pump wavelength and an input signal laser beam having seed laser pulses at a signal wavelength different from the pump wavelength to temporally adjust pulse durations of the signal laser beam and the chirped pump laser beam to output an adjusted signal laser beam and an adjusted pump laser beam;
   a fiber optical parametric amplifier (OPA) including a fiber medium and coupled to the pulse scales adjuster to receive the adjusted signal laser beam and the adjusted pump laser beam to cause a nonlinear parametric interaction in the fiber medium to produce an output signal laser beam at the signal wavelength, an output idler laser beam having output idler laser pulses at an idler wavelength, and an output pump laser beam at the pump wavelength; and a pulse compressor operable to shorten a pulse duration of one or both of the output signal laser beam and the output idler laser beam, wherein the output signal laser beam is fed back from the OPA to the pulse scale adjuster to be used as the input signal laser beam to the pulse scale adjuster.

17. The device as in claim 16, wherein the OPA includes a dispersion-engineered fiber in which the pump laser beam and the signal laser beam are co-polarized with one another.

18. The device as in claim 16, wherein the OPA includes a photonic crystal fiber (PCF).

19. The device as in claim 16, wherein the OPA includes a polarization-maintaining fiber.

20. The device as in claim 16, wherein the OPA includes a polarization-maintaining fiber in which the pump laser beam and signal laser beam are counter-polarized with one another.

* * * * *